United States Patent [19]

Gibson et al.

[11] Patent Number: 4,555,417

[45] Date of Patent: Nov. 26, 1985

[54] METHOD FOR COATING A SUBSTRATE WITH A FOAMED PROTEINACEOUS PRODUCT

[75] Inventors: Paul W. Gibson, Mt. Zion; Frank T. Orthoefer, Decatur, both of Ill.

[73] Assignee: A. E. Staley Manufacturing Company, Decatur, Ill.

[21] Appl. No.: 470,836

[22] Filed: Apr. 8, 1983

Related U.S. Application Data

[62] Division of Ser. No. 174,307, Jul. 30, 1980, Pat. No. 4,390,450.

[51] Int. Cl.[4] .......................... B05D 3/12; B05D 7/24
[52] U.S. Cl. ..................................... 427/361; 427/364; 427/365; 427/373; 427/395
[58] Field of Search ................ 252/307; 426/568, 571, 426/74, 570; 427/244, 373, 361, 364, 365, 395

[56] References Cited

U.S. PATENT DOCUMENTS

| | | | |
|---|---|---|---|
| 1,495,308 | 5/1924 | Jennings | 252/307 X |
| 2,477,255 | 7/1949 | Keil et al. | 252/307 |
| 2,767,141 | 10/1956 | Ratzer et al. | 252/307 X |
| 3,814,816 | 6/1974 | Gunther | 426/568 X |
| 4,184,914 | 1/1980 | Jenkins | 427/358 X |

FOREIGN PATENT DOCUMENTS

| | | | |
|---|---|---|---|
| 238879 | 5/1960 | Australia | 252/307 |
| 51-68486 | 6/1976 | Japan | 252/307 |

*Primary Examiner*—Evan K. Lawrence
*Attorney, Agent, or Firm*—Philip L. Bateman; James B. Guffey; Michael F. Campbell

[57] ABSTRACT

A method of preparing a substrate coated with a proteinaceous foaming composition wherein the substrate is coated with the foamed composition and the foamed composition is mechanically disintegrated to form a continuous surface coating upon the substrate. The foamed composition is prepared by ingesting gas into an aqueous medium containing a proteinaceous foaming composition consisting essentially of at least one proteinaceous foaming component selected from the group consisting of vegetable protein hydrolyzate having at least two different chelating sites, egg albumen, and casein hydrolyzate; alkaline earth metal ions, and zinc ions.

4 Claims, No Drawings

METHOD FOR COATING A SUBSTRATE WITH A FOAMED PROTEINACEOUS PRODUCT

This is a division of application Ser. No. 174,307, filed July 30, 1980, U.S. Pat. No. 4,390,450.

BACKGROUND OF THE INVENTION

A wide variety of industrial, pharmaceutical, animal and food products rely upon foamed or aerated structures. The capacity of such foams to ingest and retain gasses largely depends upon the functional attributes of its hydrophilic film-forming component. Certain naturally occurring hydrophilic film-formers, such as casein and egg albumin, are inherently excellent foam producers and do not require additional or supplemental foaming components. The essential foaming components are apparently indigenously present in such proteinaceous foaming compositions. In contrast, most other hydrophilic film-formers, especially the synthetic foaming compositions, typically require supplemental foaming additives (e.g. foam stabilizers, emulsifiers, thickeners, etc.) to achieve satisfactory foaming properties. The presence of these supplemental additives normally create more serious foaming problems than they correct. These foaming problems limit such synthetic foaming compositions to specific applications. The versatility and overall foaming efficacy of the naturally occurring protein foaming agents (e.g. egg albumen or casein) are generally recognized as superior to those foaming compositions formulated with the synthesized film-formers, including those extensively modified (chemical, physical, enzymatic, etc.) animal or plant proteins.

U.S. Pat. No. 3,814,816 by Robert C. Gunther discloses a pepsin-modified soy protein hydrolyzate foaming agent. These soy protein hydrolyzates are typically made by initially chemically hydrolyzing soy protein followed by digestion with pepsin. Commercially available pepsin modified soy protein whipping agents under this patent typically are water-soluble throughout the pH 4.0–7.0 range (20% dry protein solids concentration) and remain stable against heat denaturation at temperatures between 25° C.–180° C. Comparative to the numerous other synthetic whipping agents, these pepsin-modified soy hydrolyzates possess exceptional whipping properties. In U.S. Pat. No. 4,120,987 by Moore, conventional phosphate stabilizers (e.g. ammonium, alkali or alkaline earth metal salts of phosphate and polyphosphates) are disclosed as possible confectionery recipe additives.

Within recent years, the paper industry has utilized foams to coat or size paper products. A recently issued patent by Jenkins (U.S. Pat. No. 4,184,914) discloses "hydrolyzed protein foaming agents capable of reducing surface tension of water from a normal value of 72 dynes per centimeter to a minimum value in the range of from 45 to 65 dynes per centimeter as a functional additive for paper coating applications. Illustrative hydrolyzates disclosed by the Jenkins patentee include "keratin or albumin such as hoof and horn meal, feathers and blood." Conventional whiteners, or water-insoluble pigments, such as calcium carbonate reportedly may also be formulated into such foaming compositions. Conventional fire fighting foaming compositions which contain the hydrolyzed proteins are also reportedly applicable to this paper coating technology.

British Patent Specification No. 1,368,463 discloses that magnesium chloride, calcium chloride and ethylene glycol are conventionally added to fire fighting foams as anti-freeze additives. Such anti-freeze additives are disclosed as causing precipitation of the surfactants. The surfactants are reportedly essential for foaming. Formamide is proposed as an anti-freezing agent replacement since it will not affect the surfactant functionality in the foaming system. The benefits of using Pyrene Plus F (a fire foam composition) formulated with formamide as an anti-freezing agent instead of magnesium choloride are reported in Example 1. Chemical Abstracts, Vol. 84 also reports that foaming agents, water-, heat- and chemical-resistant and stable foams for cement products and fire extinguishing applications may be obtained by combining the alkali hydrolyzate products of microbes with certain metallic salts.

The ability of certain proteins to form metal complexes (chelation) is known. A general review of this chemistry is disclosed in *The Handbook of Food Additives* (2nd Ed) by Furia (CRC Press (1972)). According to Furia; "For chelation to occur two chemical conditions must be satisfied: (1) the ligand must have the proper steric and electronic configuration in relation to the metal being complexed and (2) the surrounding milieu (pH, ionic strength solubility, etc.) must likewise be conducive to complex formation." Illustrative metal/chelating agent complexes disclosed by Furia include: barium, calcium, cobalt, copper, ferrous, ferric, magnesium, maganese, nickel, strontium and zinc ions.

Foams are complex. Certain additives conducive to satisfactory foams in certain systems will often adversely affect other systems. Within the field of proteinaceous materials, it is possible to derive an unlimited number of different film-forming compositions by physically, chemically or enzymatically altering or modifying the protein molecule. Such divergencies apparently arise because of the infinite compositional, molecular, steric and electronic configuration differences therebetween. As a general rule, most proteinaceous film-forming materials (modified or unmodified) are ineffective foaming agents. Even amongst the recognized protein foaming agents, such as egg albumen, casein; different foaming attributes and compatibility with other recipe additives exist. Certain foaming applications will require the unique foaming functionality and compatibility of egg albumen while others will require casein. Additives complementary to egg albumen foam often destroy the unique foaming efficacy of casein.

The desirability of a low-cost, whipping protein has long seen sought by the art. The vegetable proteins are recognized as a low cost protein source, but generally possess inadequate whipping properties to compete with egg albumen and casein systems. In the art's attempt to improve upon the whipping efficacy of vegetable proteins, a host of chemical, enzymatic and physical processing modifications have been suggested.

The inventors sought to improve upon the foaming efficacy of proteinaceous materials and particularly those which are obtained from abundant and low cost raw materials. It has been discovered that a combination of certain metal ions and protein hydrolyzates will unexpectedly yield superior foams. Laboratory evidence indicates certain water-soluble proteinaceous materials apparently possess at least two different chelating sites which require at least two different types of chelating metal ions to obtain an improved foaming effect. Within the field of soy protein, only certain types of hydrolyzates appear to possess this multi-site functionality. As a result of their discovery, it is now possible to achieve the unique foaming attributes of egg albumen and/or casein from a vegetable protein source. The foaming compositions of this invention may be used in a wide variety of industrial, pharmaceutical and food applications.

SUMMARY OF THE INVENTION

The present invention describes an improved method for preparing a substrate coated with a proteinaceous foaming composition wherein an aqueous medium containing a proteinaceous foaming component is ingested with a sufficient amount of a gas to provide a foamed product, a substrate is coated with foamed product and the foamed product is mechanically disintegrated to form a continuous surface coating upon said substrate, the improvement which comprises ingesting gas into an aqueous medium containing a proteinaceous foaming composition consisting essentially of at least one proteinaceous foaming component selected from the group consisting of vegetable protein hydrolyzate having at least two different chelating sites egg albumen, and casein hydrolyzate, at least 0.005 mole alkaline earth metal ions for each mole of nitrogen in said proteinaceous component and at least 0.002 mole zinc ions for each mole of nitrogen in said proteinaceous component.

DESCRIPTION OF THE INVENTION

An essential component of the present invention is the proteinaceous foaming component. The proteinaceous foaming component, in combination with at least two different water-soluble polyvalent metal ions, cooperatively produce a foamed volume measurably greater than that volume obtained by the exclusion of at least one of the polyvalent metal ions from the metal ion combination. In general, the proteinaceous foaming component herein will form proteinaceous solutes (i.e. water-soluble) when admixed with 20° C. water (20% by weight dry solids concentration level) at a pH above or below the isoelectric point of the proteinaceous foaming component. Illustrative proteinaceous foaming components include the water-soluble animal, plant and microbial proteins and the hydrolyzate products thereof. These water-soluble proteins are generally characterized as film-formers in that when they are applied as an aqueous solution onto a solid substrate (e.g. paper, glass, etc.) and then dried by conventional coating techniques, the dried proteins form a protein film or coating.

The proteinaceous foaming components adapted to this invention include those proteins which contain at least two different metal chelating groups and will disperse into aqueous solutions with or without other solutes to facilitate their solubility therein such as acids, bases, salts, alcohols, etc. Illustrative proteinaceous foaming components include the simple proteins (e.g. yield only amino acids or their derivatives upon hydrolysis) such as albumins (soluble in water and coagulable by heat); globulins (soluble in salt solutions and heat coagulable); glutelins (soluble in dilute acids or bases); histones (soluble in water or dilute acids, precipitated by ammonia and not coagulated by heat); protamines (soluble in water, uncoagulable by heat); conjugated proteins such as phosphoproteins, chromoproteins, lecithoproteins, etc.; protein hydrolyzates such as metaproteins (e.g. acid or base hydrolyzates); proteoses (soluble in water, not coagulated by heat and precipitated in saturated solution by ammonium or zinc sulfate); peptones (water-soluble, noncoagulable by heat, not precipitated by ammonium sulfate); peptides; mixtures thereof and the like. Such protein foaming compositions thereof include egg albumen, casein hydrolyzates, keratin hydrolyzates (e.g. from skin, fur, wool, nails, hoofs, horns, scales, beaks, feathers, etc.); vegetable protein hydrolyzates (e.g. soy peptones, soy albumin, etc.); whey or milk serum proteins (lactoalbumin); wheat albumins and/or globulins, conalbumin, avidin, etc.

In a more limited embodiment of the invention, the protein foaming component consists essentially of albumins and/or albumin hydrolyzates, and preferably the peptone hydrolyzates. Although such albumin hydrolyzates may be obtained by chemical (e.g. acid or base hydrolysis) or enzymatic hydrolysis (catenase or endocatenase), those albumin hydrolyzates characterized as being water-soluble throughout the pH 4.0–7.0 range have been found to be particularly effective protein foaming components. The present invention affords a low-cost and pragmatic means for obtaining effective foams from plant proteins and particularly from oil-bearing seed materials such as soybean, peanut, peas, bean, sunflower seed, sesame seed, cottonseed, etc.

Although the invention applies to a wide variety of protein hydrolyzates, effective foams may be obtained from protein hydrolyzates of a low sulfur-containing amino acid content (e.g. cysteine, methionine, etc.), particularly the plant protein hydrolyzates of less than 1% sulfur-containing amino acids and preferably less than 0.5% by weight. Vegetable protein hydrolyzates such as those derived from leguminous sources (e.g. peanuts, cottonseed, soybean, etc.) are particularly useful for this purpose. Excessive hydrolysis which destroys the film-forming and gas ingestion properties of the protein should be avoided. Soy protein hydrolyzates such as disclosed in U.S. Pat. No. 3,814,816 in conjunction with the metal ion combination herein produce superior foamed volumes. These proteins are commercially available and may be prepared by chemical hydrolysis to a prescribed viscosity range and thereafter enzymatically hydrolyzing the soy protein hydrolyzate with pepsin. Such a dual hydrolysis process apparently imparts multi-metal functionality to the soy protein molecules. Alternatively the protein hydrolyzate may be derived from certain water-soluble fractions which are isolated and partitioned from the higher-molecular weight, isoelectric precipitated heat-denaturable proteins. Vegetable protein hydrolyzates which are characterized as possessing film-forming properties sufficient to permit gas ingestion into recipe formulations, remaining water-soluble throughout the pH 4.0–7.0 range at a 20% concentration and not subject to heat-denaturization throughout the 25° C.–150° C. range, are especially suitable for use as the whipping protein component.

As illustrated by the examples, certain proteinaceous foaming components will cooperatively produce and enhance foamed volume while other closely related proteinaceous foaming agents are unaffected by the presence of the metal ion combination. Substances which chemically, sterically or physically interfer with the protein/metal ion combination interaction should be eliminated from the foaming component as well as the foaming composition. The water-soluble monovalent proteinates (e.g. sodium caseinate, sodium soy proteates, etc.) effectively inhibit or destroy the foaming efficacy of the protein molecules and the polyvalent metal ion combination. Likewise, indigenous and extraneous contaminants such as carbohydrate (e.g. glycoproteins), which interfer with the metal ion/protein foaming component combination, should be eliminated from the system. Accordingly, it is advantageous to use a proteinaceous material having a protein content of at least 50% by weight and preferably at least 70% by weight protein (e.g. soy protein concentrate) as the proteinaceous foaming component. Tests also tend to indicate that soy hydrolyzate products produced by endoproteases, such as pepsin, result in more efficacious protein foaming components than those obtained from only chemical catenase or exoprotease hydrolysis.

The foaming compositions of this invention rely upon a combination of at least two metals which collectively produce a greater foamed volume in comparison to that obtained by the separate use of each metal ion. On an equal molar concentration basis, the metal ion combination, as opposed to the separate use of only one of the metal ions, will generally decrease the foamed density by at least 10% and most typically by at least 15%. The metal ion combination permits a more uniform inert gas ingestion and retention throughout the foamed structure. This apparently arises because of the exceptional elasticity and strength which the metal ion combination imparts to the protein foaming agent. This improvement permits a more homogeneous distribution of the ingested gas, as minute gas bubbles, throughout the foamed structure. Consequently a lesser amount of protein may be used to achieve an equivalent volume of foam in a wide variety of foaming applications. The improved foaming efficacy and low protein foaming agent costs represents a substantial raw material cost savings to the foam manufacturer. Other beneficial results occurring to the foam manufacturer include ease of preparation, excellent handling, machinability, coating (e.g. uniformity, adhesiveness, flow, compatibility, drying, etc.) attributes.

The particular metal ions necessarily added to measurably increase the foamed volume will depend upon the multi-metal ion coordinating sites of the proteinaceous foaming component. Illustrative polyvalent chelating metal ions include $Ba^{++}$, $Ca^{++}$, $Co^{++}$, $Cu^{++}$, $Fe^{++}$, $Fe^{+++}$, $Cr^{++}$, $Ti^{++}$, $Zr^{++}$, $Mg^{++}$, $Mn^{++}$, $Cd^{++}$, $Ni^{++}$, $Sr^{++}$, $Zn^{++}$, etc. ions. Polyvalent metal ions contaning two electrons in their outer orbital level are best suited (e.g. 37th Ed. *Handbook of Chemistry & Physics*, page 255). The metal ions may be suitably incorporated into the aqueous foaming composition as water-soluble salts. Exemplary salts include the polyvalent metal acid salts such as the acetate, bromate, chloride, chlorate, iodide, nitrate, sulfate, sulfite, lactate, nitrite, thiosulfate, mixtures thereof and the like. The water-soluble salts of strong mineral acids (e.g. hydrohalides, sulfuric acids, etc.) are preferred.

The metal ion combination of zinc and calcium ions are particularly effective. Zinc and calcium are similar to one another in that they both contain two outer electrons in the 4s level with the internal 1s, 2s, 2p, 3s, 3p levels being completely filled. Zinc. however, has its full complement of 3d electrons whereas calcium does not. However, both of these metal ions have a stable and symmetrical electronic configuration with respect to their inner orbits. This may contribute to their unique and superior foaming attributes herein. This combination is particularly effective when used in combination with simple proteins and the hydrolyzate products thereof. Superior foaming efficacy has been achieved via the use of these metal ions in combination with water-soluble proteinaceous materials such as egg albumen, alkali-hydrolyzed casein, keratin hydrolyzates, chemically and pepsin modified soy proteins, etc. The separate use of either zinc or calcium ions will not yield this superior foaming effect. By using edible calcium and zinc water-soluble salts, as the polyvalent metal ion source, edible foaming compositions may be obtained.

The concentration of the polyvalent metal ions combination added to the foaming composition should measurably increase the total foamed volume comparative to that achieved via their separate use. For most applications, the added metal ion concentration will be greater than 0.002 mole for each nitrogen mole of the foaming composition component. Illustrative foaming compositions relying upon the zinc and calcium ion combination broadly include a total minimum metal ion concentration of 0.005 mole/mole nitrogen (e.g. about 0.005 to about 0.5 mole/mole nitrogen). Excessive metal ions will not generally affect the foaming efficacy of the system but can adversely affect its functionality in those systems wherein it is desired to reduce the water-solubility of the finished product (e.g. coating applications). For most applications involving the calcium and zinc ion combination, the ionic concentration (based on one mole of nitrogen) will typically range from about 0.002 mole to about 0.1 for the zinc ions (preferably from about 0.005 mole to about 0.05 mole) and from about 0.005 mole to about 0.5 mole for calcium ions with the preferred level ranging from about 0.01 mole to about 0.05 mole.

The foamed compositions of this invention are suitably prepared by initially dispersing the proteinaceous foaming component and the metal ion combination into an aqueous dispersion of an appropriate viscosity for whipping. The overall combination provides a protein system which forms elastic films at the air/water interface with the metal ions facilitating the gas retention of the external film-forming phase. The ease of incorporating gas into the system and the ability to form minute and uniform gas bubbles throughout the aerated structure are evidenced by significantly reduced densities of the foamed product. The water-retention characteristics of the external film phase is improved by steric, chemical and polar alignment of the molecules within the whipping composition. The water-attractive forces of the metal ions, the polar alignment of the protein molecules, the water adsorbtion properties of the film, etc. contribute to the homogeneity and amount of water may be bound by the foamed composition.

Depending upon the desired end-use, other additives such as flavoring, coloring agents, microbicides, antioxidants, humectants, fats, oils, surface active agents, particulates, etc., and the like, may be formulated with the foaming composition, provided they do not destroy its foaming characteristics. A variety of natural or synthetic hydrophilic film-former or gums may be used in minor amounts, as thickening or viscosity-modifying agents. Illustrative thereof are water-soluble or water-dispersible celluloses (e.g. methyl, carboxymethyl, hydroxypropyl and hydroxyethyl celluloses), seaweed extracts (e.g. agar, carrageenan, furcellaran, etc.), tree extrudates and extracts (e.g. ghatti, arabic, larch, karaya, arabinogalactan, tragacanth, etc.), seed or root gums (e.g. guar, locust bean, quince seed, etc.), microbial gums (e.g. dextran, xanthans, etc.), gelatin pectin, modified and emulsified starch-bearing materials, vinyl polymers (e.g. polyvinylpyrrolidene, polyvinyl alcohol, etc.), acrylic polymer, polyacrylic acid, polyacrylamide, polyethylene oxide, mixtures thereof and the like. Such starch-bearing materials include granular, prepasted, hydrolyzed (enzymatically or chemically), derivatized starches, starch fractions, dextrin, etc. A wide variety of starch derivatives (e.g. starch ethers and esters, including cationic, non-ionic, anionic, amphoteric) may be used as ancillary film-forming additives. Typical derivatized starch-bearing materials include oxidized starch, starch phosphates, starch esters (the fumarates, acetates, proprionates, succinates, glutamates, citrates, maleates, itaconates, etc.), alkyl ethers (e.g. ethyl, propyl, butyl, etc. starch ethers), the hydroxyalkyl starch ethers), carboxyalkyl starch ethers, nitrogen-containing starch ethers (e.g. such as the cationic starches frequently used in paper and textile sizing operations), phosphonium starch ethers, starch carbamates, starch xanthates, sulfuric acid derivatives of starch, mixtures thereof and the like.

The aerated confections are ingested with a sufficient amount of gas to provide a foamed product. Conventional aerating gases (e.g. air, nitrogen, carbon dioxide, nitrogen oxide, halogenated hydrocarbon such as used as a propellant and refrigerant, etc.) may be used. The aeration may be conducted batch-wise or continuously in conventional aerating equipment such as Hobart mixers, Savage beaters, Votators, Oakes mixers, etc.

In a more limited embodiment of the present invention there is provided a dry foaming composition which is adapted upon reconstitution with water and aeration to provide a foamed product, said dry foaming composition consisting essentially of proteinaceous film-forming component and a combination of at least two metal ions of differing atomic numbers, with said metal ions being present in said dry foaming composition in an amount sufficient to reduce the density of the foamed product prepared therefrom when said dry composition is reconstituted in water and aerated with an inert gas. These dry foaming compositions are ideally suited for use in a wide variety of foaming applications. The dry foaming compositions may be suitably prepared by dissolving the proteinaceous foaming component and water-soluble salts of the metal ion combination into aqueous solutions and drying the resultant solution to provide a dry foaming composition thereof. Conventional drying techniques such as vacuum-, freeze-, drum-, spray-, etc. drying techniques, may be used to dry the foaming composition completely. If the proteinaceous foaming component is susceptible to heat-denaturization (e.g. egg albumin), denaturization thereof should be avoided by maintaining the aqueous solution and drying conditions below the heat denaturization temperature of the protein component.

Water-soluble vegetable protein hydrolyzates not susceptible to thermal denaturization (e.g. @ 25° C.–150° C.) afford definitive advantages over the heat-denaturable proteins in these dry foaming compositions. Bacterial and enzymatic contamination may be effectively alleviated by appropriately sterilizing or pasteurizing the foaming composition ingredients during the preparation of the dry foaming composition. The water-soluble prerequisite properties of the proteinaceous foaming component are unaffected by such thermal processing conditions.

Alternatively, the aqueous solution may be aerated with an inert gas by conventional techniques prior to the drying thereof. This will facilitate drying as well as creating minute entrapped gas sites homogeneously dispersed throughout the dried foaming composition. These minute gas bubble sites effectively increase the surface area and porosity of the dried foaming composition. This permits more rapid and complete dissolution of the foaming composition upon aqueous reconstitution. In addition, the presence of these minute gas sites in the dry foaming composition will provide minute nucleating sites to facilitate gas ingestion in the foam preparation step. This affords a more homogeneous distribution of the ingested gas in the form of minute gas bubbles within the foamed product.

The water-soluble polyvalent metal ions in the dry foaming composition also enhances the rate at which the proteinaceous foaming component will dissolve into aqueous systems. When reconstituted, these water-soluble metal salts (which are uniformly embedded within the proteinaceous foaming matrix agent) rapidly dissolve to increase the liquid/solid interface surface area and therefore permit more rapid dissolution of the protein foaming component into reconstituting aqueous medium.

If desired, other conventional foaming additives such as mentioned above may be incorporated into the aqueous solution prior to the drying thereof. The dry foaming composition may also be combined with all of the other finished recipe additives to provide a dry foaming composition which may be directly converted to the finished recipe product. Alternatively, the dry foaming composition may be dry blended in a dry free-flowing granular form along with other recipe additives to provide a complete or partial dry mix.

The foamed proteinaceous products of this invention may be prepared by conventional aerating techniques. The foamed products are unusually effective in the manufacture of paper products sized with a proteinaceous material by conventional foam sizing processes such as disclosed in British Patent Specification No. 1,039,540 and U.S. Pat. No. 4,184,914. In such sizing paper manufacture, the proteinaceous foam is applied to the surface of a substrate (e.g. paper, paper board, etc.) then mechanically disintegrated (e.g. by passing the foam-coated paper through pressure rolls) to form a continuous proteinaceous surface coating and dried to provide a dry film coating upon the surface of the substrate.

The mole of protein nitrogen determinations for the proteinaceous foaming component were made by the A.O.A.C. 2.051 (1970 Ed.) Kjeldahl method.

EXAMPLE I

A spray-dried proteinaceous foaming composition containing protein whipping agent concentrate in combination with calcium zinc ions was prepared. The proteinaceous foaming agent[1] utilized in this example was prepared in accordance with Example I of U.S. Pat. No. 3,814,816. An aqueous solution of the proteinaceous foaming agent was concentrated in a vacuum evaporator at a temperature not exceeding 145° F. (63° C.) to a 37% to 38% solids level as determined by a calibrated sugar refractometer. Under vigorous agitation, there was then respectively added zinc chloride and calcium chloride dihydrate in amounts equal to 1.33% and 2.66% of the final product dry weight. The salts were incorporated into the concentrated protein solution by separately predissolving an equivalent weight amount of zinc dichloride (25 pounds) and calcium chloride (50 pounds) in water. The resultant metal-containing proteinaceous solution was cooled to 30° C. with continuous agitation. The resultant homogeneous solution was then pumped to a DeLaval vertical spray dryer equipped with a SC- 107 spray nozzle and operated at an inlet temperature of 300°–325° F. and an outlet air temperature of 190°–195° C. The proteinaceous metal-containing solution was fed to the spray dryer under a pressure of 3600 psig to 3800 psig. The spray dryer was operated so as to yield a product having a 7% maximum moisture content. The resultant spray-dried product was ground and screened through a 40-mesh screen. The resultant spray-dried product contained less than 7% by weight moisture, a protein content of approximately 77% by weight, less than 19% ash, a pH of 5 to 5.6, a maximum fat content of 0.4% by weight.

(1)Gunther D-100 Whipping Agent, A. E. Staley Manufacturing Company Decatur, Ill.

Proteinaceous foams were then prepared from the spray-dried foaming composition by reconstituting 1 part by weight foaming agent into 400 parts by weight water. The foams were prepared by ingesting air into the reconstituted foaming composition in an Oakes Model 4MB2A pressure beater operated at an air supply of 0.26 to 0.37 cubic feet per minute at 100 psi., 1340 r.p.m. rotor speed, 300 ml. per minute feed rate, a 5′ by 5/16″ outlet tubing configuration and an average outlet temperature of 124° F. The resultant foam product had an average density of 0.208 grams/ml. For comparative purposes, the same protein whipping agent, without any metal additives, was similarly reconstituted and prepared into a foam product. The average foam density for this product was only 0.298 grams/ml.

EXAMPLE II

Run 1—Control

Twenty grams of industrial grade[2] modified corn starch was hydrated in 180 ml. distilled water. To this there was then added 0.9 grams of spray-dried enzyme modified soy protein whipping agent[3]. This mixture was then placed in a 3½ qt. mixing bowl for a Hobart C100 vertical-type mixer and beat at high speed for 30 minutes (using the Hobart's wire whisk agitator). A 0.436 gram/ml. foam density was obtained thereby.

(2)STAZYME GNW starch, A. E. Staley Manufacturing Company, Decatur, Ill.
(3)Gunther D-100 W.A., Decatur, Ill.

Run 2

To illustrate the efficacy of $Zn^{++}$ and $Ca^{++}$ ions, the above Run 1 was duplicated except that 0.025 gram $ZnCl_2$ and 0.050 gram $CaCl_2.2H_2O$ were added prior to foaming. The density of the foamed product was 0.252 gram/ml. which represents a 42.2% improvement over the Run 1 control.

Run 3

Run 2 was repeated by substituting other commercially available whipping agents for the spray-dried soy albumin whipping agent:

|  | Density | |
| --- | --- | --- |
|  | with $Ca^{++}$ and $Zn^{++}$ | w/o $Zn^{++}$ and $Ca^{++}$ |
| A. Spray dried egg albumen[4] | 0.370 g/ml. | 0.623 g/ml. |
| B. Alkali hydrolyzed caseinate[5] | 0.151 g/ml. | 0.235 g/ml. |

(4)Henningsen Spray dried egg white solids, Type P-20, Henningsen Foods White Plains, N.Y.
(5)Hyfoama DS Lenderink & Co., N.V. Schiedam, Holland

Run 4

| | |
| --- | --- |
| H₂O | 88.58% |
| Starch | 9.54% |
| Foaming protein | 1.88% |
| | 100.00% |

A cooked starch/whipping agent mixture consisting (weight basis) of 88.58% water, 9.54% industrial starch[6] and 1.88% foaming protein[7] was fed to Oakes mixer as described in Example I. Machine output was allowed to stabilize before taking multiple (at intervals of ~5 minutes) samples for density determinations. Average values for foam densities were 0.250 gram/ml. at an average outlet temperature of 119.8° F.

(6)STAZYME GNW Starch, A. E. Staley Manufacturing Company, Decatur, Ill.
(7)Foaming Protein-Gunthur R308-A. E. Staley Manufacturing Company Decatur, Ill.

Run 5

Run 4 was repeated with the exception that 0.059% $ZnCl_2$ and 0.10% $CaCl_2.2H_2O$ was included into the formulation prior to whipping. Average density values were 0.169 gram/ml. at an average outlet temperature of 128.9° F.

Run 6

A foamed protein product was prepared by reconstituting 12.1% modified starch[8] and 1.9% foaming[9] into water. The cooked starch/whipping protein mixture was fed to the Oakes mixer according to Run 5. Average foam density was 0.327 gram/ml at an average temperature of 129.3° F.

(8)STAZYME GNW
(9)Gunther D-100 W.A.

Run 7

Run 6 was repeated employing a cooked starch-/foaming protein/salt mixture containing 85.850% water, 12.090% starch, 1.900% foaming protein, 0.054% $ZnCl_2$ and 0.106% $CaCl_2.2H_2O$. Average density obtained thereby was 0.213 gram/ml. at an average outlet temperature of 140° F. In Runs 6 and 7, the starch level was increased to place additional stress on the foaming protein.

Run 8

Foams were prepared in accordance with the methodology of Run 7 employing 89.315% water, 9.624% starch[2] and 1.060% foaming protein[1]. The average foamed density was 0.298 gram/ml at an average outlet temperature of 124° F.

Run 9

Foams were prepared in accordance with the methodology of Run 7 employing 89.231% water, 9.614% starch, 1.131% foaming protein, 0.009% $ZnCl_2$ and 0.015% $CaCl_2.2H_2O$ to yield an average foam density of 0.201 gram/ml. at an average temperature of 129.4° F. outlet.

EXAMPLE III

This example illustrates the utility of the present invention in preparing foamed edible food products.

Run 10

Marshmallow suitable for cutting and coating was prepared from the following:

| Formula | % | grams used |
|---|---|---|
| Gelatin - 225 bloom | 2.04 | 4.1 |
| $H_2O$ | 18.14 | 36.3 |
| Sugar-granulated | 36.28 | 72.6 |
| Corn syrup - 42 D.E. | 43.54 | 87.1 |
| Flavor | — | — |
| | 100.00% | 200.1 grams |

Procedure:
1. Using ½ of formula's $H_2O$, soak gelatin minimum of 15 minutes.
2. Using balance of formula's $H_2O$, dissolve sugar—will require heating.
3. Weigh corn syrup into 3½ qt. bowl of C100 Hobart beater.
4. Combine sugar solution, gelatin with syrup, mix well.
5. Using wire whisk, beat in 2nd speed (medium) to density of ~0.45 g/ml.

Density of the resultant marshmallow product after whipping 10 minutes was 0.477 gram/ml. This material was slabbed, cooled and held for comparison.

Run 11

| Formula | % | grams used |
|---|---|---|
| Gelatin-225 bloom | 2.045 | 4.1 |
| $H_2O$ | 18.11 | 36.3 |
| Sugar-granular | 36.22 | 72.6 |
| Syrup - 42 D.E. | 43.46 | 87.1 |
| Flavor | — | — |
| $ZnCl_2$ | 0.055 | 0.11 |
| $CaCl_2.2H_2$ | 0.110 | 0.22 |
| | 100.000% | 200.43 grams |

The procedure for this run was exactly the same as for Run 10 above. Whipped density after 10 minutes was 0.457 gram/ml. This material also was slabbed, cooled and held for comparison.

Samples of both marshmallows were placed in elevated temperature storage (45°–50° C.) After ~24-hour storage, the Run 11 sample possessed a significantly better texture than the Run 10 sample.

Run 12

Meringue formulation:

| Formula Base Mix | % | grams used |
|---|---|---|
| Egg albumen[10] | 15.0 | 7.5 |
| Foaming protein[11] | 13.0 | 6.5 |
| Pregel starch[12] | 25.0 | 12.5 |
| Dextrose[13] | 40.0 | 20.0 |
| NaCl | 2.5 | 1.25 |
| Carrageenan[14] | 2.0 | 1.00 |
| Sodium aluminum sulfate | 1.7 | — |
| CMC[15] | 0.8 | 0.4 |
| | 100.0% | 49.15 grams |

[10]Henningsen spray dried egg white solids
[11]Hyfoama DS
[12]REDISOL 333, A. E. Staley Mfg. Company, Decatur, Illinois
[13]STALEYDEX 333, A. E. Staley Mfg. Company, Decatur, Illinois
[14]Viscarin 402, Marine Colloids, Springfield, New Jersey
[15]7HSXP CMC, Hercules, Wilmington, Delaware Procedure
1. Dry blend all ingredients in 3½ qt. C100 Hobart bowl.
2. Weigh 268 g. sugar, dry blend with other ingredients.
3. Add 300 ml. $H_2O$ @ 150°–170° F. to dry mix.
4. Mix 1 minute at slow speed using wire whisk.
5. Beat at medium speed (2nd) for approximately 8 minutes. Density should be 0.2–0.25 gram/ml.
6. Spread on pie and bake @ 375° F. for 12–14 minutes.

After 8 minutes whip, meringue density was 0.280 gram/ml with weak peaks formed when tested with spatula.

Run 13

Run 12 was repeated with the exceptions that 0.175 g. $ZnCl_2$ 0.35 g. $CaCl_2.2H_2O$ were added in addition to other ingredients. The meringue reached peak whipped volume after approximately 4 minutes although test ran for 8. Density after 8 minutes was 0.266 gram/ml. Firm peaks were formed when tested with spatula.

EXAMPLE IV.

Run 14

Forty grams starch[16] was hydrated in 360 g. distilled $H_2O$, placed in 3½ qt. bowl of Hobart C100 mixer. To this was added 0.9 gram soy whipping protein agent.[17] The combined materials were beat at high speed for 30 minutes using the Hobart's wire whisk. Temperature was maintained at 150° F. for the duration of the test. Final foam density was checked by filling a container of known volume and weight. Calculated density was 0.502 gram/ml.

[16]STAZYME GNW
[17]Gunther D-100 W.A.

Run 15

Forty grams starch[16] was hydrated in 360 grams distilled $H_2O$ placed in 3½ qt. bowl of Hobart C100 mixer to which was added 0.86 g. soy protein whipping agent[17], 0.025 g. $CaCl_2.2H_2O$, 0.012 g. $CdSO_4$. The combined materials were beaten at high speed while maintaining the mix temperature at 150° F. Total whip time again was 30 minutes. Foam density was calculated at 0.442 gram/ml.
[16]Supra
[17]Supra

Run 16

Forty grams starch[16] was hydrated in 360 grams distilled $H_2O$ placed in 3½ qt. Bowl of Hobart C100 mixer to which was added 0.86 g. soy protein whipping agent[17], 0.025 g. $CaCl_2.2H_2O$, 0.020 g. $CdSO_4$. The combined materials were beaten at high speed for 30 minutes while maintaining a mix temperature of 150° F. Calculated density was 0.380 gram/ml.

What is claimed is:

1. In an improved method for preparing a substrate coated with a proteinaceous foaming composition wherein an aqueous medium containing a proteinaceous foaming component is ingested with a sufficient amount of a gas to provide a foamed product, a substrate is coated with foamed product and the foamed product is mechanically disintegrated to form a continuous surface coating upon said substrate, the improvement which comprises ingesting gas into an aqueous medium containing a proteinaceous foaming composition consisting essentially of at least one proteinaceous foaming component selected from the group consisting of vegetable protein hydrolyzate having at least two different chelating sites, egg albumen, and casein hydrolyzate, at least 0.005 mole alkaline earth metal ions for each mole of nitrogen in said proteinaceous component and at least 0.002 mole zinc ions for each mole of nitrogen in said proteinaceous component.

2. The method according to claim 1 wherein the substrate surface comprises paper.

3. The method according to claim 2 wherein the proteinaceous foaming component is a vegetable protein hydrolyzate which consists essentially of a soy protein hydrolyzate characterized as being water-soluble throughout the pH 4.0–7.0 range.

4. The method according to claim 3 wherein the aqueous medium containing the proteinaceous foaming component is prepared by reconstituting in an aqueous medium prior to the ingestion of gas therein a dry foaming composition containing less than 10% moisture, a soy protein hydrolyzate, and calcium ions.

* * * * *